United States Patent
Takemura et al.

(10) Patent No.: US 9,416,234 B2
(45) Date of Patent: *Aug. 16, 2016

(54) METHOD FOR PRODUCING FLUORINE-CONTAINING RUBBER MOLDED ARTICLE

(75) Inventors: Kohei Takemura, Settsu (JP); Tomihiko Yanagiguchi, Settsu (JP); Kazuyoshi Kawasaki, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 160 days.

This patent is subject to a terminal disclaimer.

(21) Appl. No.: 13/062,718

(22) PCT Filed: Sep. 7, 2009

(86) PCT No.: PCT/JP2009/065583
§ 371 (c)(1),
(2), (4) Date: Mar. 8, 2011

(87) PCT Pub. No.: WO2010/029899
PCT Pub. Date: Mar. 18, 2010

(65) Prior Publication Data
US 2011/0184126 A1 Jul. 28, 2011

(30) Foreign Application Priority Data
Sep. 9, 2008 (JP) ................................ 2008-231011

(51) Int. Cl.
| | |
|---|---|
| C08J 3/00 | (2006.01) |
| C08J 3/24 | (2006.01) |
| C08L 27/16 | (2006.01) |
| C08K 5/13 | (2006.01) |
| C08K 5/50 | (2006.01) |
| C08L 23/08 | (2006.01) |
| C08L 27/18 | (2006.01) |
| C08K 3/22 | (2006.01) |

(52) U.S. Cl.
CPC .. C08J 3/24 (2013.01); C08L 27/16 (2013.01); C08J 2315/02 (2013.01); C08J 2327/04 (2013.01); C08J 2327/12 (2013.01); C08K 3/22 (2013.01); C08K 5/13 (2013.01); C08K 5/50 (2013.01); C08L 23/0892 (2013.01); C08L 27/18 (2013.01); C08L 2205/02 (2013.01)

(58) Field of Classification Search
CPC ........................................................ C08J 3/24
USPC ................................................. 525/199, 200
See application file for complete search history.

(56) References Cited

U.S. PATENT DOCUMENTS

| | | | |
|---|---|---|---|
| 4,094,949 A | 6/1978 | Yokokawa et al. | |
| 5,354,811 A * | 10/1994 | Kamiya et al. | 525/200 |
| 6,005,054 A * | 12/1999 | Barbieri et al. | 525/326.3 |
| 6,160,053 A | 12/2000 | Enokida et al. | |
| 6,310,141 B1 | 10/2001 | Chen et al. | |
| 8,137,812 B2 * | 3/2012 | Kitahara et al. | 428/421 |
| 8,796,384 B2 * | 8/2014 | Takemura et al. | 525/199 |
| 2003/0125466 A1 | 7/2003 | Chmielewski | |
| 2006/0041069 A1 | 2/2006 | Sumi et al. | |
| 2006/0194021 A1 * | 8/2006 | Takeda et al. | 428/141 |
| 2007/0225430 A1 | 9/2007 | Masuda et al. | |
| 2008/0032080 A1 * | 2/2008 | Faulkner et al. | 428/36.91 |
| 2009/0011164 A1 * | 1/2009 | Masuda | C08L 27/18 428/36.92 |
| 2010/0056694 A1 * | 3/2010 | Hirose et al. | 524/448 |
| 2012/0108753 A1 * | 5/2012 | Takemura et al. | 525/199 |

FOREIGN PATENT DOCUMENTS

| | | |
|---|---|---|
| CN | 1703480 A | 11/2005 |
| CN | 1743370 A | 3/2006 |
| CN | 1954029 A | 4/2007 |
| EP | 0 168 020 A2 | 1/1986 |
| EP | 1 243 617 A1 | 9/2002 |
| EP | 1816161 A1 | 8/2007 |
| EP | 1995277 A1 | 11/2008 |
| JP | 2-261850 A | 10/1990 |
| JP | 06-025500 A | 2/1994 |
| JP | 06-248147 A | 9/1994 |
| JP | 08-120145 A | 5/1996 |
| JP | 08120145 * | 5/1996 |
| JP | 09-268245 A | 10/1997 |
| JP | 2001-011272 A | 1/2001 |
| JP | 3555628 B2 | 8/2004 |
| WO | WO2008093803 * | 8/2008 |
| WO | WO 2008093803 A1 | 8/2008 |

OTHER PUBLICATIONS

FluonETFE flyer, 2010.*
Polyvinylidene Fluoride flyer, 1996.*
Office Action issued May 14, 2013 for counterpart JP Appln. No. 2010-528713.
Moore, Albert L., Fluoroelastomers Handbook, the Definitive User's Guide and Databank, 2006, 17 pages total.
McKeen, Laurence W., Fluorinated Coatings and Finishes Handbook, the Definitive User's Guide and Databank, 2006, 15 pages total.

* cited by examiner

*Primary Examiner* — Irina Krylova
(74) *Attorney, Agent, or Firm* — Sughrue Mion, PLLC

(57) ABSTRACT

There is provided a crosslinkable fluorine-containing rubber composition being capable of giving a fluorine-containing rubber crosslinked and molded article having a low friction coefficient and assuring an increased proportion of a fluorine-containing resin around the surface of a fluorine-containing rubber, a molded article obtained by crosslinking the composition, and a method for producing the molded article. The crosslinkable fluorine-containing rubber composition comprises a fluorine-containing rubber (A) comprising vinylidene fluoride unit, a fluorine-containing resin (B) and a polyol crosslinking agent (C),
wherein the fluorine-containing rubber (A) and the fluorine-containing resin (B) are kneaded at a temperature of not less than a temperature being lower by 5° C. than the melting point of the fluorine-containing resin (B).

2 Claims, No Drawings

METHOD FOR PRODUCING FLUORINE-CONTAINING RUBBER MOLDED ARTICLE

This is a National Stage of Application No. PCT/JP2009/065583 filed Sep. 7, 2009, claiming priority based on Japanese Patent Application No. 2008-231011 filed Sep. 9, 2008, the contents of all of which are incorporated herein by reference in their entirety.

TECHNICAL FIELD

The present invention relates to a crosslinkable fluorine-containing rubber composition, a molded article obtained by crosslinking the composition and a method for producing the molded article. These are suitable as various sealing materials, sliding parts, non-sticking parts and parts having a water- and oil-repellent surface.

BACKGROUND ART

Fluorine-containing rubbers exhibit excellent chemical resistance, solvent resistance and heat resistance, and therefore, are widely used in various fields such as automobile industry, semiconductor industry and chemical industry. For example, in automobile industry, fluorine-containing rubbers are used as hoses, sealing materials, etc. for engine and its peripheral equipment, driving equipment, and fuel system and its peripheral equipment.

However, fluorine-containing rubbers, for example, propylene/tetrafluoroethylene copolymer rubber, etc. are subject to embrittlement at low temperatures in some cases, and for improvement therefor, there is proposed a method of blending an ethylene/tetrafluoroethylene copolymer resin (ETFE) having a melting point of 240° C. to 300° C., and after melt-kneading, carrying out radiation crosslinking or peroxide crosslinking (Patent Document 1).

Also, in Patent Document 2, there is described a method of press-crosslinking a fluorine-containing rubber composition comprising a fluorine-containing rubber (vinylidene fluoride (VdF) type rubber), a fluorine-containing resin (ETFE) and a fluorine-containing thermoplastic elastomer (at 160° C. for ten minutes) and then crosslinking in an oven (at 180° C. for four hours) to produce a crosslinked rubber having improved thermal strength.

These Patent Documents do not mention surface characteristics, particularly characteristics of a crosslinked rubber. This is because rubbers are inherently high in friction coefficient due to elastomeric property thereof.

Accordingly, in the field of sealing materials, a method of laminating a fluorine-containing resin (or a fluorine-containing resin fiber layer) on a surface of rubber (Patent Documents 3 and 4) and a method of forming a coating film of a fluorine-containing resin on a surface of rubber (Patent Document 5) as a method of decreasing friction coefficient while making best use of rubber characteristics.

PRIOR ART DOCUMENTS

Patent Documents

Patent Document 1: JP50-32244A
Patent Document 2: JP6-25500A
Patent Document 3: JP7-227935A
Patent Document 4: JP2000-313089A
Patent Document 5: JP2006-292160A

DISCLOSURE OF INVENTION

Problem to be Solved by the Invention

However, when a fluorine-containing resin layer is formed on a rubber surface by lamination or coating, enhancement of adhesion at an interface between the fluorine-containing rubber and the fluorine-containing resin is a very important problem, and the present situation is such that solution of the problem is troublesome.

The present invention was completed by finding out that when a crosslinkable fluorine-containing rubber composition comprising a specific fluorine-containing rubber and fluorine-containing resin is subjected to heat treatment step under specific conditions in addition to a usual crosslinking step without carrying out a lamination method or a coating method, unexpectedly a ratio of a fluorine-containing resin on a surface of a molded article is significantly increased and a fluorine-containing rubber crosslinked molded article enabling a problem with an interface adhesion to be solved can be obtained.

It is an object of the present invention to provide a crosslinkable fluorine-containing rubber composition being capable of providing a fluorine-containing rubber crosslinked molded article having an increased ratio of a fluorine-containing resin on a surface of a molded article and assuring low friction resistance, a molded article obtained by crosslinking the composition, and further a method for producing the molded article.

Means to Solve the Problem

The present invention relates to a crosslinkable fluorine-containing rubber composition comprising a fluorine-containing rubber (A) comprising vinylidene fluoride (VdF) unit, a fluorine-containing resin (B) and a polyol crosslinking agent (C), wherein the fluorine-containing rubber (A) and the fluorine-containing resin (B) are kneaded at a temperature of not less than a temperature being lower by 5° C. than the melting point of the fluorine-containing resin (B).

It is preferable that the fluorine-containing resin (B) is a tetrafluoroethylene (TFE)/hexafluoropropylene (HFP) copolymer, an ethylene/TFE copolymer, a chlorotrifluoroethylene (CTFE)/TFE copolymer, a TFE/HFP/VdF copolymer or polyvinylidene fluoride (PVdF).

It is preferable that the mass ratio (A)/(B) of the fluorine-containing rubber (A) to the fluorine-containing resin (B) is 60/40 to 97/3.

The present invention also relates to a fluorine-containing rubber molded article obtained by crosslinking the above-mentioned crosslinkable fluorine-containing rubber composition of the present invention.

Also the present invention relates to a method for producing a fluorine-containing rubber molded article comprising:
(I) a step for kneading for obtaining the above-mentioned crosslinkable fluorine-containing rubber composition,
(II) a step for molding and crosslinking the obtained kneaded article, and
(III) a step for heat treatment by heating the obtained crosslinked molded article up to a temperature of not less than a melting point of the fluorine-containing resin (B).

It is preferable that in the kneading step (I), after kneading the fluorine-containing rubber (A) and the fluorine-containing resin (B) at a temperature of not less than the melting point of the fluorine-containing resin (B), other additives for the rubber composition are blended and kneading is carried out at a temperature being lower than a crosslinking and molding temperature since uniform kneading is assured and finally uniform surface state can be achieved.

Further, the present invention relates to a fluorine-containing rubber molded article obtained by the production method of the present invention.

The fluorine-containing rubber molded article obtained by crosslinking the crosslinkable fluorine-containing rubber composition of the present invention and the fluorine-containing rubber molded article obtained by the production method of the present invention are useful as sealing materials, sliding members, non-sticking members and molded articles having a water- and oil-repellent surface.

Effect of the Invention

The present invention can provide a fluorine-containing rubber molded article having an increased ratio of a fluorine-containing resin on a surface of a fluorine-containing rubber and assuring low friction resistance, non-sticking property and water- and oil-repellent surface. The fluorine-containing rubber molded article of the present invention is useful as sealing materials, sliding members, non-sticking members and molded articles having a water- and oil-repellent surface.

BEST MODE FOR CARRYING OUT THE INVENTION

The crosslinkable fluorine-containing rubber composition of the present invention is the crosslinkable fluorine-containing rubber composition comprising the fluorine-containing rubber (A) comprising vinylidene fluoride (VdF) unit, the fluorine-containing resin (B) and the polyol crosslinking agent (C), wherein the fluorine-containing rubber (A) and the fluorine-containing resin (B) are kneaded at a temperature of not less than a temperature being lower by 5° C. than the melting point of the fluorine-containing resin (B).

The components of the crosslinkable fluorine-containing rubber composition are explained below.
(A) Fluorine-Containing Rubber Comprising VdF Unit (VdF Type Fluorine-Containing Rubber)

The VdF type fluorine-containing rubber has good processability and good compression set characteristics.

Preferred examples of VdF type fluorine-containing rubber are those represented by the formula (1).

(in the formula, the structural unit $M^1$ is a structural unit ($m^1$) derived from VdF, the structural unit $M^2$ is a structural unit derived from a fluorine-containing ethylenic monomer ($m^2$), the structural unit $N^1$ is a repeat unit derived from a monomer ($n^1$) being copolymerizable with the monomer ($m^1$) and the monomer ($n^1$))

Among the VdF type fluorine-containing rubbers represented by the formula (1), preferred are those comprising the structural unit $M^1$ in an amount of 30 to 85% by mole and the structural unit $M^2$ in an amount of 70 to 15% by mole, more preferably those comprising the structural unit $M^1$ in an amount of 30 to 80% by mole and the structural unit $M^2$ in an amount of 70 to 20% by mole. It is preferable that the structural unit $N^1$ is contained in an amount of 0 to 10% by mole based on the total amount of structural unit $M^1$ and structural unit $M^2$.

Examples of the fluorine-containing ethylenic monomer ($m^2$) are fluorine-containing monomers such as TFE, CTFE, trifluoroethylene, HFP, trifluoropropylene, tetrafluoropropylene, pentafluoropropylene, trifluorobutene, tetrafluoroisobutene, perfluoro(alkyl vinyl ether) (hereinafter also referred to as PAVE) and vinyl fluoride, and among these, TFE, HFP and PAVE are preferred.

Any of monomers being copolymerizable with the monomer ($m^1$) and the monomer ($m^2$) may be used as the monomer ($n^1$), and examples thereof are ethylene, propylene, alkyl vinyl ether and the like.

Preferred examples of the VdF type fluorine-containing rubbers are one or more of VdF/HFP type rubber, VdF/HFP/TFE type rubber, VdF/CTFE type rubber, VdF/CTFE/TFE type rubber, VdF/PAVE type rubber, VdF/TFE/PAVE type rubber, VdF/HFP/PAVE type rubber and VdF/HFP/TFE/PAVE type rubber.

Among these VdF type fluorine-containing rubbers, VdF/HFP type rubber and VdF/HFP/TFE type rubber are especially preferred from the viewpoint of heat resistance, compression set, processability and cost.

Also, preferred are fluorine-containing rubbers having a number average molecular weight of 20,000 to 1,200,000, more preferably 30,000 to 300,000, further preferably 50,000 to 200,000.

Also, the fluorine-containing rubbers to be used in the present invention are preferably those having a fluorine content of not less than 60% by mass, more preferably not less than 65% by mass. An upper limit of the fluorine content is not limited particularly, and is preferably not more than 74% by mass. When the fluorine content is less than 60% by mass, there is a tendency that chemical resistance, fuel oil resistance and low fuel permeability are inferior.

The fluorine-containing rubbers explained above can be prepared by usual methods.
(B) Fluorine-Containing Resin The fluorine-containing resin (B) to be used is not limited particularly, and is preferably a fluorine-containing resin comprising at least one fluorine-containing ethylenic polymer especially from the viewpoint of good compatibility with the VdF type fluorine-containing rubber. It is preferable that the fluorine-containing ethylenic polymer has a structural unit derived from at least one fluorine-containing ethylenic monomer. Examples of the above-mentioned fluorine-containing ethylenic monomer are perfluoroolefins such as tetrafluoroethylene (TFE) and perfluoro ethylenically unsaturated compounds represented by the formula (4):

wherein $R_f^2$ is $—CF_3$ or $—OR_f^3$ ($R_f^3$ is a perfluoroalkyl group having 1 to 5 carbon atoms); and fluoroolefins such as chlorotrifluoroethylene (CTFE), trifluoroethylene, hexafluoroisobutene, vinylidene fluoride (VdF), vinyl fluoride and compounds represented by the formula (5):

wherein $X^3$ is hydrogen atom or fluorine atom, $X^4$ is hydrogen atom, fluorine atom or chlorine atom, and n is an integer of 1 to 10.

The fluorine-containing ethylenic polymer may have a structural unit derived from a monomer copolymerizable with the above-mentioned fluorine-containing ethylenic monomer, and examples of such a monomer are non-fluorine-containing ethylenic monomers other than the above-mentioned fluoroolefins and perfluoroolefins. Examples of the non-fluorine-containing ethylenic monomer are, for instance, ethylene, propylene and alkyl vinyl ethers. The alkyl vinyl ethers are those having an alkyl group having 1 to 5 carbon atoms.

Among these, preferred are any of the following fluorine-containing ethylenic polymers from the viewpoint of excellent low fuel permeability and cold resistance of the obtained layered product.
(1) Ethylene/TFE copolymer (ETFE) comprising TFE and ethylene,
(2) TFE-perfluoro(alkyl vinyl ether) copolymer (PFA) comprising TFE and a perfluoro ethylenically unsaturated compound represented by the formula (4) or TFE/HFP copolymer (FEP),
(3) TFE/VdF/perfluoro ethylenically unsaturated compound copolymer comprising TFE, VdF and the perfluoro ethylenically unsaturated compound represented by the formula (4),
(4) Polyvinylidene fluoride (PVdF), and
(5) CTFE/TFE/perfluoro ethylenically unsaturated compound copolymer comprising CTFE, TFE and the perfluoro ethylenically unsaturated compound represented by the formula (4).

The fluorine-containing ethylenic polymers of (1), (2) and (5) are preferred, and the fluorine-containing ethylenic polymer of (1) is especially preferred.

Next, the preferred fluorine-containing ethylenic polymers of (1), (2) and (5) are explained below.

(1) ETFE

ETFE is preferable from the viewpoint that dynamical physical properties and low fuel permeability are exhibited in addition to the above-mentioned actions and effects. A molar ratio of the TFE unit to the ethylene unit is preferably 20:80 to 90:10, more preferably 37:63 to 85:15, especially preferably 38:62 to 80:20. In addition, the polymer may contain a third component. Kind of the third component is not limited particularly as far as it is copolymerizable with TFE and ethylene. Usually monomers represented by the following formulas:

wherein $X^5$ is hydrogen atom or fluorine atom; $R_f^4$ is a fluoroalkyl group which may have ether bond-formable oxygen atom, are used as the third component. Of these monomers, fluorine-containing vinyl monomers represented by $CH_2=CX^5R_f^4$ are more preferable, and monomers having $R_f^4$ having 1 to 8 carbon atoms are especially preferable.

Examples of the fluorine-containing vinyl monomers represented by the above-mentioned formula are 1,1-dihydroperfluoropropene-1,1,1-dihydroperfluorobutene-1,1,1,5-trihydroperfluoropentene-1,1,1,7-trihydroperfluoroheptene-1,1,1,2-trihydroperfluorohexene-1,1,1,2-trihydroperfluorooctene-1,2,2,3,3,4,4,5,5-octafluoropentylvinylether, perfluoro(methyl vinyl ether), perfluoro(propyl vinyl ether), hexafluoropropene, perfluorobutene-1,3,3,3-trifluoro-2-(trifluoromethyl)propene-1 and 2,3,3,4,4,5,5-heptafluoro-1-pentene ($CH_2=CFCF_2CF_2CF_2H$).

The content of the third component is preferably 0.1 to 10% by mole, more preferably 0.1 to 5% by mole, especially preferably 0.2 to 4% by mole based on the fluorine-containing ethylenic polymer.

(2) PFA or FEP

PFA or FEP is preferable since heat resistance is particularly excellent in the above-mentioned actions and effects, and further excellent low fuel permeability is exhibited in addition to the above-mentioned actions and effects. Proportions of the components of PFA or FEP are not limited particularly. Preferred is a copolymer comprising 70 to 99% by mole of a TFE unit and 1 to 30% by mole of a unit of perfluoro ethylenically unsaturated compound represented by the above-mentioned general formula (4), more preferred is a copolymer comprising 80 to 97% by mole of a TFE unit and 3 to 20% by mole of a unit of perfluoro ethylenically unsaturated compound represented by the above-mentioned general formula (4). When the TFE unit is less than 70% by mole, mechanical properties tend to be lowered, and when the TFE unit exceeds 99% by mole, there is a tendency that a melting point becomes too high and moldability is lowered. In addition, the fluorine-containing ethylenic polymer comprising TFE and the perfluoro ethylenically unsaturated compound represented by the general formula (4) may contain a third component. Kind of the third component is not limited as far as it is copolymerizable with TFE and the perfluoro ethylenically unsaturated compound represented by the formula (4). Examples of the third component are ethylene, propylene and alkyl vinyl ethers. Example of PFA or FEP comprising the third component is an ethylene/TFE/HFP copolymer (EFEP).

(5) CTFE-TFE Copolymer

In the case of CTFE-TFE copolymer, a molar ratio of the CTFE unit to the TFE unit is preferably CTFE:TFE=2:98 to 98:2, more preferably 5:95 to 90:10. When the amount of CTFE unit is less than 2% by mole, there is a tendency that low fuel permeability is lowered and melt-processability becomes difficult, and when the amount of CTFE unit exceeds 98% by mole, there is a case where heat resistance at molding and chemical resistance are lowered. Also, it is preferable that a perfluoro ethylenically unsaturated compound is copolymerized and the amount of a perfluoro ethylenically unsaturated compound unit is 0.1 to 10% by mole based on the total amount of CTFE unit and TFE unit. The total amount of CTFE unit and TFE unit is preferably 90 to 99.9% by mole. When the amount of a perfluoro ethylenically unsaturated compound unit is less than 0.1% by mole, moldability, and stress crack resistance or environmental stress crack resistance are easily lowered, and when the amount exceeds 10% by mole, low fuel permeability, heat resistance, mechanical properties and productivity are inferior.

Among these, ETFE is preferred from the viewpoint of especially excellent compatibility with the fluorine-containing rubber (A), particularly VdF type fluorine-containing rubber.

A melting point of the fluorine-containing ethylenic polymer to be used as the fluorine-containing resin (B) is preferably 120° C. to 340° C., more preferably 150° C. to 330° C., further preferably 170° C. to 320° C. When the melting point of the fluorine-containing ethylenic polymer is less than 120° C., bleed-out tends to occur at molding by crosslinking, and when the melting point exceeds 340° C., mixing of the VdF type fluorine-containing rubber (A) tends to become difficult.

To the fluorine-containing resin (B) may be added at least one polyfunctional compound for enhancement of compatibility. The polyfunctional compound is a compound having two or more functional groups having the same or different structures in one molecule.

Optional functional groups which are generally known to have reactivity, such as carbonyl group, carboxyl group, haloformyl group, amide group, olefin group, amino group, isocyanate group, hydroxy group and epoxy group can be used as a group of the polyfunctional compound. It can be expected that the compounds having these functional groups not only have affinity for the VdF type fluorine-containing rubber (A) but also reacts with the above-mentioned group of the fluorine-containing resin (B) to further enhance adhesion.

(C) Crosslinking Agent

In the present invention, a polyol crosslinking agent is used. A crosslinked fluorine-containing rubber obtained by crosslinking with a polyol type crosslinking agent is characterized by having small compression set and good heat resistance.

Compounds known as a crosslinking agent for fluorine-containing rubbers are used as a polyol crosslinking agent, and for example, polyhydroxy compounds, especially polyhydroxy aromatic compounds are suitably used from the viewpoint of good heat resistance.

Non-limiting examples of the polyhydroxy aromatic compounds are bisphenol A, bisphenol AF, resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane, 4,4-bis(4-hydroxyphenyl)valerate, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A and 3,3',5,5'-tetrabromobisphenol A. These polyhydroxy aromatic compounds may be alkali metal salts and alkali earth metal salts, but in the case of coagulating a copolymer by using an acid, it is preferable not to use the above-mentioned metal salts.

Among these, polyhydroxy compounds are preferred from the viewpoint of small compression set of the crosslinked fluorine-containing rubber and excellent moldability, and polyhydroxy aromatic compounds are more preferred and bisphenol AF is further preferred from the viewpoint of good heat resistance.

An amount of the polyol crosslinking agent is preferably 0.2 to 10 parts by mass, more preferably 0.5 to 6 parts by mass, further preferably 1 to 3 parts by mass based on 100 parts by mass of the fluorine-containing rubber. When the amount of the crosslinking agent is less than 0.2 part by weight, there is a tendency that a crosslinking density is low and compression set is large, and when the amount of the crosslinking agent exceeds 10 parts by mass, since a crosslinking density is too high, there is a tendency that cracking easily occur at applying compression.

Also, it is preferable to use a crosslinking accelerator in combination with the polyol crosslinking agent. When a crosslinking accelerator is used, formation of double bond in a molecule is accelerated in a de-fluorination reaction at a trunk chain of the fluorine-containing rubber, thereby enabling a crosslinking reaction to be accelerated.

A crosslinking accelerator for the polyol crosslinking is not limited particularly, and there can be used onium salts. Particularly quaternary ammonium salts and quaternary phosphonium salts are preferable. From the viewpoint of proper crosslinking speed and good physical properties in normal state and compression set of a molded article, it is preferable to use 8-benzyl-1,8-diazabicyclo[5.4.0]-7-undeceniumchloride (DBU-B) and/or benzyltriphenylphosphonium chloride (BTPPC) alone or in combination thereof or further in combination with other onium salts.

In the crosslinkable fluorine-containing rubber composition, a mass ratio (A)/(B) of the fluorine-containing rubber (A) to the fluorine-containing resin (B) is preferably 60/40 to 97/3. When the amount of fluorine-containing resin (B) is too small than (A)/(B)=97/3, there is a tendency that an effect of reducing a friction coefficient is small, and on the other hand, when the amount of fluorine-containing resin (B) is too large than (A)/(B)=60/40, there is a tendency that inherent rubber elasticity is significantly impaired and flexibility is lost. (A)/(B) is preferably 65/35 to 95/5, further preferably 70/30 to 90/10 since both of flexibility and friction property are satisfactory.

To the crosslinkable fluorine-containing composition may be added additives for assisting the crosslinking such as a crosslinking accelerator, crosslinking aid, co-crosslinking agent and acid acceptor in addition to the fluorine-containing rubber (A), the fluorine-containing resin (B) and the crosslinking agent (C).

The crosslinking agent, crosslinking aid, co-crosslinking agent and crosslinking accelerator are used for crosslinking of the fluorine-containing rubber. Here, the crosslinking is for crosslinking the same or different polymer chains of the fluorine-containing rubber with a crosslinking agent, and such crosslinking provides the fluorine-containing rubber with improved tensile strength and good elasticity.

Also, to the composition can be added usual various compounding agents to be added to fluorine-containing rubbers according to necessity, for example, filler, processing aid, plasticizer, coloring agent, stabilizer, adhesion aid, mold-releasing agent, conductivity-imparting agent, thermal conductivity-imparting agent, surface non-sticking property-imparting agent, flexibility-imparting agent, heat resistance improver and flame retardant, and one or more usual crosslinking agent and crosslinking accelerator being different from those mentioned above may be added. These additives and compounding agents may be used to an extent not to impair the effect of the present invention.

The composition of the present invention does not contain a fluorine-containing thermoplastic elastomer.

It is necessary that the crosslinkable fluorine-containing rubber composition of the present invention is prepared by melt-kneading the fluorine-containing rubber (A) and the fluorine-containing resin (B) at a temperature of not less than a temperature being lower by 5° C. than the melting point of the fluorine-containing resin (B), preferably at a temperature of not less than the melting point of the fluorine-containing resin (B). By kneading at a temperature of not less than a temperature being lower by 5° C. than the melting point of the fluorine-containing resin (B), mechanical strength is improved. An upper limit of a heating temperature is less than a lower thermal decomposition temperature of either the fluorine-containing rubber (A) or the fluorine-containing resin (B). Such melt-kneading is explained infra in detail in the invention of the preparation method.

Then, the method of preparing the fluorine-containing molded article of the present invention is explained below.

The method of preparing the fluorine-containing molded article of the present invention comprises:

(I) a kneading step for kneading the crosslinkable fluorine-containing rubber composition of the present invention, (II) a crosslinking and molding step for crosslinking and molding the obtained kneaded article, and (III) a heat-treating step for heating the obtained crosslinked and molded article up to a temperature of not less than the melting point of the fluorine-containing resin (B)

Each step is explained below.

(I) Kneading Step

The crosslinkable fluorine-containing rubber composition to be kneaded is the above-mentioned crosslinkable fluorine-containing rubber composition of the present invention. In the kneading step, the VdF type fluorine-containing rubber (A), the fluorine-containing resin (B), the polyol crosslinking agent (C), and if necessary, additives such as a crosslinking aid, co-crosslinking agent and crosslinking accelerator and other compounding agents such as filler are kneaded to prepare the crosslinkable fluorine-containing rubber composition.

Particularly by previously melt-kneading the fluorine-containing rubber (A) and the fluorine-containing resin (B) at a temperature of not less than a temperature being lower by 5° C. than the melting point of the fluorine-containing resin (B), preferably at a temperature of not less than the melting point of the fluorine-containing resin (B), mechanical strength is improved. An upper limit of a heating temperature is less than a lower thermal decomposition temperature of either the fluorine-containing rubber or the fluorine-containing resin.

The melt-kneading of the fluorine-containing rubber (A) and the fluorine-containing resin (B) is not carried out under the conditions (in the presence of a crosslinking agent, a crosslinking accelerator and an acid acceptor) causing crosslinking at the melt-crosslinking temperature. However, components (for example, only a specific crosslinking agent, only combination of a crosslinking agent and a crosslinking accelerator, or the like) causing no crosslinking at a melt-kneading temperature of not less than a temperature being lower by 5° C. than the melting point of the fluorine-containing resin (B) may be added and mixed at melt-kneading. Combination of the crosslinking agent (C), a crosslinking accelerator and an acid acceptor causes crosslinking at a temperature of not less than a temperature being lower by 5° C. than the melting point of the fluorine-containing resin (B).

Accordingly, in the kneading step (I) of the present invention, it is preferable to employ a two-staged kneading method of melt-kneading the fluorine-containing rubber (A), the fluorine-containing resin (B) and the crosslinking agent (C) to prepare a pre-compound (pre-mixture) and then kneading other additives and compounding agents at a temperature less than the crosslinking temperature to prepare a full compound. It is a matter of course that a method of kneading all the components at a temperature less than the crosslinking temperature (thermal decomposition temperature) of the crosslinking agent (C) may be employed.

The melt-kneading can be carried out by kneading the fluorine-containing rubber (A) and the fluorine-containing resin (B) at a temperature of not less than a temperature being lower by 5° C. than the melting point of the fluorine-containing resin (B), for example, at a temperature of not less than 160° C., further not less than 200° C., usually from 250° C. to 300° C. by using Banbury mixer, pressure kneader, extruder or the like. Among these, it is preferable to use a pressure kneader or an extruder such as a biaxial extruder since a high shearing force can be applied.

In the two-staged kneading method, a full compound can be prepared at a temperature less than a decomposition temperature of the crosslinking agent (C), for example, at a temperature of not more than 100° C. by using an open roll, banbury mixer or pressure kneader.

Here, there is a method of treating (dynamic crosslinking) by crosslinking a fluorine-containing rubber in a fluorine-containing resin under melting conditions of the fluorine-containing resin as a method treatment similar to the melt-kneading in the present invention. This dynamic crosslinking is a method of blending a rubber in a matrix of a thermoplastic resin, crosslinking the rubber with kneading, and dispersing the crosslinked rubber in the matrix in the micron order. On the other hand, in the present invention, melt-kneading is carried out under the conditions causing no crosslinking (in the absence of components necessary for crosslinking or in a formulation causing no crosslinking reaction at the melt-kneading temperature). The melt-kneading in the present invention substantially differs from dynamic crosslinking in the point that in the present invention, the matrix becomes an un-crosslinked rubber and in the mixture, a fluorine-containing resin is uniformly dispersed in the un-crosslinked rubber.

It is conjectured that the crosslinkable fluorine-containing rubber composition obtained in the kneading step of the present invention has a structure such that the fluorine-containing rubber (A) forms a continuous phase and the fluorine-containing resin (B) forms a dispersed phase or both of the fluorine-containing rubber (A) and the fluorine-containing resin (B) form a continuous phase.

It is conjectured that by forming such a structure, crosslinking reaction can be carried out smoothly in the crosslinking step (II), crosslinking state of the obtained crosslinked article becomes uniform, and also, surface migration phenomenon of the fluorine-containing resin (B) in the heat-treatment step (III) proceeds uniformly and as a result a uniform surface can be obtained.

(II) Molding and Crosslinking Step

This step is a step for preparing a molded and crosslinked article by molding and crosslinking the crosslinkable fluorine-containing rubber composition obtained in the kneading step.

Non-limiting examples of a molding method are an extrusion molding method, pressure molding method such as metallic mold, injection molding method and the like.

For crosslinking, usual methods such as steam crosslinking, pressure molding method and a method of starting crosslinking reaction by heating can be employed. A method of radiation crosslinking at normal temperature at normal pressure is a well-known method, but in the present invention, a method of starting crosslinking reaction by heating at a temperature of not less than the thermal decomposition temperature of the crosslinking agent (C) is especially excellent since migration of the fluorine-containing resin toward a surface layer proceeds smoothly.

Molding and crosslinking of the crosslinkable fluorine-containing rubber composition may be carried out within a range of known method and conditions. Also, molding and crosslinking may not be in order and may be carried out in parallel.

For example, in the case of a hose and a long sheet, a method of crosslinking after extrusion molding is proper, and in the case of a molded article of irregular form, there can be employed a method of preparing a crosslinked article in the form of block and then conducting molding treatment such as cutting. Also, in the cases of relatively simple molded articles such as piston ring and oil seal, there is usually employed a method of carrying out molding and crosslinking simultaneously in a metallic mold.

Non-limiting usual crosslinking conditions are a temperature range from 150° C. to 300° C. and a crosslinking time from one minute to 24 hours, and the conditions are optionally determined depending on kind of a crosslinking agent to be used.

In crosslinking of rubbers, there is a case of carrying out a post-treatment step called the secondary crosslinking after conducting the first crosslinking treatment (called the primary crosslinking), but as explained in the following heat-treating step (III), the conventional secondary crosslinking step differs from the molding and crosslinking step (II) and the heat-treating step (III) of the present invention.

(III) Heat-Treating Step

In this heat-treating step, the obtained crosslinked and molded article is heated up to a temperature of not less than the melting point of the fluorine-containing resin (B).

In the present invention, the heat-treating step (III) is a step to be carried out for increasing the content of fluorine-containing resin on a surface of the crosslinked and molded article, and for this purpose, a heat-treating temperature of not less than the melting point of the fluorine-containing resin (B)

and less than the thermal decomposition temperatures of the fluorine-containing rubber (A) and the fluorine-containing resin (B) is used.

When the heating temperature is lower than the melting point, the content of fluorine-containing resin on a surface of the crosslinked and molded article is not increased sufficiently. In order to avoid thermal decomposition the fluorine-containing rubber and the fluorine-containing resin, the heating temperature must be a temperature less than a lower thermal decomposition temperature of either the fluorine-containing rubber (A) or the fluorine-containing resin (B). A preferred heating temperature is a temperature higher by 5° C. than the melting point of the fluorine-containing resin since friction resistance is easily made low in a short period of time.

The above-mentioned upper limit temperature is in the case of usual fluorine-containing rubbers, and in the case of a rubber having ultra high heat resistance, an upper limit temperature of a rubber having ultra high heat resistance is its decomposition temperature. Therefore, the above-mentioned upper limit temperature is not applied to a rubber having ultra high heat resistance.

A heating temperature has a close relation with a heating time, and therefore, it is preferable that when a heating temperature is a temperature relatively close to a lower limit temperature, heating is conducted for a relatively long period of time, and when a heating temperature is a temperature relatively close to an upper limit temperature, heating is conducted for a relatively short period of time. Accordingly, a heating time may be optionally set in relation to a heating temperature, but if the heat treatment is conducted for so long period of time, there is a case of causing deterioration of a fluorine-containing rubber. Therefore, a heat treating time is practically up to 48 hours except the case of using a fluorine-containing rubber having heat resistance. Usually the heat treating time is preferably from one minute to 48 hours, more preferably from one minute to 24 hours from the viewpoint of good productivity.

Such a phenomenon that the ratio of fluorine-containing resin on a surface of a crosslinked molded article becomes high, which occurs in the heat-treating step (III), was first found out by the inventors of the present invention.

By the way, conventional secondary crosslinking is carried out for the purpose of completely decomposing a crosslinking agent remaining after the primary crosslinking to complete crosslinking of a fluorine-containing rubber and improving mechanical properties and compression set characteristics of a crosslinked molded article.

Accordingly, in the conventional secondary crosslinking where the fluorine-containing resin (B) is not supposed to be present, even if its crosslinking conditions incidentally overlap the conditions for heating in the heat-treating step of the present invention, the conditions for heating in the secondary crosslinking are only for the purpose of completing crosslinking of a fluorine-containing rubber (completely decomposing a crosslinking agent) without considering the presence of a fluorine-containing resin as a factor for setting the crosslinking conditions. Therefore, conditions for heating for softening and melting of the fluorine-containing resin (B) in the crosslinked rubber (not un-crosslinked rubber) cannot be deduced.

In the molding and crosslinking step (II) of the present invention, secondary crosslinking may be carried out for completing the crosslinking of the fluorine-containing rubber (A) (for completely decomposing the crosslinking agent (C)). Also, in the heat-treating step (III), there is a case where decomposition of the remaining crosslinking agent (C) occurs and crosslinking of the fluorine-containing rubber (A) is completed, but such crosslinking of the fluorine-containing rubber (A) in the heat-treating step (III) is only a secondary effect.

It is conjectured that the fluorine-containing rubber crosslinked and molded article obtained by the preparation method of the present invention is in a state of the ratio of the fluorine-containing resin being increased in the surface area.

Such a state of the ratio of the fluorine-containing resin being increased in the surface area can be testified by chemically analyzing the crosslinked and molded article after the heat treatment by ESCA and IR.

For example, in the ESCA analysis, atomic groups being present in the molded article from its surface up to about 10 nm depth can be determined, and after the heat treatment, a ratio ($P_{ESCA}1/P_{ESCA}2$) of peak ($P_{ESCA}1$) due to bonding energy derived from the fluorine-containing rubber to peak ($P_{ESCA}2$) derived from the fluorine-containing resin becomes small, namely the number of atomic groups of the fluorine-containing resin is increased.

Also, in the IR analysis, atomic groups being present in the molded article from its surface up to about 0.5 μm to about 1.2 μm depth can be determined, and after the heat treatment, a ratio ($P_{IR0.5}1/P_{IR0.5}2$) of peak ($P_{IR0.5}1$) of characteristic absorption derived from the fluorine-containing rubber in 0.5 μm depth to peak ($P_{IR0.5}2$) derived from the fluorine-containing resin becomes small, namely the number of atomic groups of the fluorine-containing resin is increased. In addition, when comparing a ratio ($P_{IR0.5}1/P_{IR0.5}2$) in 0.5 μm depth to a ratio ($P_{IR1.2}1/P_{IR1.2}2$) in 1.2 μm depth, the ratio ($P_{IR0.5}1/P_{IR0.5}2$) in 0.5 μm depth becomes small, namely it is indicated that the ratio of the fluorine-containing resin is increased in the area near the surface.

A molded article prepared by modifying a surface of a fluorine-containing rubber by coating or adhesion of a fluorine-containing resin does not exhibit such an inclination of the ratio of the fluorine-containing resin as in the present invention. The fluorine-containing rubber crosslinked and molded article exhibiting an inclination distribution of the ratio of the fluorine-containing resin is a novel molded article.

Since the ratio of the fluorine-containing resin in the surface area is high, properties of the fluorine-containing resin, for example, low friction property, non-sticking property and water- and oil-repellency are significantly improved as compared with fluorine-containing resins subjected to no heat treatment, and on the contrary, in the area other than the surface area, properties of the fluorine-containing rubber are exhibited. Thus, the fluorine-containing rubber crosslinked and molded article having well balanced low friction property, non-sticking property, water- and oil-repellency and elastomeric property can be obtained. Further, since there is no clear interfacial condition between the fluorine-containing resin and the fluorine-containing rubber, the surface area being rich in the fluorine-containing resin is not released, and the molded article is excellent in durability.

The molded article of the present invention is useful as a sealing material, sliding member and non-sticking member by making use of its low friction property, non-sticking property and water- and oil-repellency (high contact angle).

Non-limiting examples of molded articles are as follows.

Sealing Material:

Examples are an O- or square-ring, packing, gasket, diaphragm and other sealing materials in the semiconductor-related fields such as semiconductor manufacturing equipment, liquid crystal panel manufacturing equipment, plasma panel manufacturing equipment, plasma address liquid crystal panel, field emission display panel, and solar cell substrate, and these can be used on CVD equipment, dry etching equipment, wet etching equipment, oxidation and diffusion equipment, sputtering equipment, ashing equipment, cleaning equipment, ion implantation equipment and exhaust equipment. Concretely these can be used as O-ring and sealing material for a gate valve, as O-ring and other sealing materials for a quartz window, as O-ring and other sealing materials for a chamber, as O-ring and other sealing materials for a gate, as O-ring and other sealing materials for a bell jar, as O-ring and other sealing materials for a coupling, as O-ring, diaphragm and other sealing materials for a pump, as O-ring and other sealing materials for a gas control equipment for semiconductor, and as O-ring and other sealing materials for a resist developing solution and releasing solution.

In the field of automobile, the molded article can be used as a gasket, shaft seal, valve stem seal and various sealing materials for engine and its peripheral equipment and various sealing materials for driving equipment. Examples of sealing materials to be used on a fuel system and its peripheral equipment are O- or square-ring, packing and diaphragm. Concretely there can be used as engine head gasket, metal gasket, oil pan gasket, crank shaft seal, cam shaft seal, valve stem seal, manifold packing, seal for oxygen sensor, injector O-ring, injector packing, fuel pump O-ring, diaphragm, crank shaft seal, gear box seal, power piston packing, cylinder liner seal, valve stem seal, front pump seal of automatic transmission gear, rear axle pinion seal, universal joint gasket, speed meter pinion seal, foot brake piston cup, O-ring of torque transmission, oil seal, seal of exhaust gas recirculation combustion equipment, bearing seal, and diaphragm for carburetter sensor.

In the fields of airplane, rocket and ship, there are diaphragm, O- or square-ring, valve, packing and various sealing materials, and these can be used on a fuel system. Concretely in the field of airplane, there are jet engine valve stem seal, gasket, O-ring, rotating shaft seal, gasket for hydraulic equipment and fire wall seal, and in the field of ship, propeller shaft stern seal of screw, valve stem seal for suction and exhaust of diesel engine, butterfly valve seal and butterfly valve shaft seal.

In the field of chemical plant, there are valve, packing diaphragm, O- or square-ring, and various sealing materials, and these can be used for processes for preparing chemicals such as pharmaceuticals, agricultural chemicals, coatings and resins. Concretely there can be used for pump for chemicals, seal of flow meter and piping, seal for heat exchanger, packing for glass cooler of sulfuric acid manufacturing equipment, seal of agricultural chemicals sprinkler and transfer pump, seal of gas piping, seal for plating solution, packing for high temperature dryer, belt roll seal for paper making, seal of fuel cell, duct joint seal, gas chromatography, packing for tube joint of pH meter, seal of analyzer and physical and chemical apparatuses, diaphragm, valve parts and the like.

For developing machine in the field of photograph, for printing machine in the field of printing and for coating facilities in the field of coating, the molded article can be used as seal and valve parts of dry copying machine.

In the field of food plant equipment, there are exemplified a valve, packing, diaphragm, O- or square-ring, and various sealing materials which can be used on food producing process. Concretely the molded article can be used as seal of plate type heat exchanger and solenoid valve seal of vending machine.

In the field of equipment for atomic power plant, there are exemplified packing, O-ring, diaphragm, valve and various sealing materials.

In the field of general industries, there are exemplified packing, O-ring, diaphragm, valve and various sealing materials. Concretely the molded article can be used for seal of hydraulic and lubricating machine, bearing seal, window and other seals of dry cleaner, seal of uranium hexafluoride concentrator, seal (vacuum) valve of cyclotron, seal of automatic packaging machine, and diaphragm of pump for analyzing sulfur dioxide and chlorine gas in the air (pollution control equipment).

In the electrical field, concretely the molded article is used as a venting seal for an insulating oil cap and liquid seal transformer of Shin-kansen train.

In the field of fuel cell, the molded article is used as a sealing material between the electrode and the separator, seals for hydrogen, oxygen and produced water piping.

In the field of electronic parts, concretely the molded article is used as a heat-releasing material, electromagnetic wave shielding material and gasket for hard disc drive of computer.

Un-limiting examples of molded articles which can be subjected molding at site are gasket for oil pan of engine, gasket of magnetic recorder and sealing material for filter unit of clean room.

Also, the molded article can be used especially suitably as sealing materials for clean facilities such as gasket for magnetic recorder (hard disc drive) and seal ring materials for semiconductor manufacturing equipment and device storage for wafer.

Further, the molded article can be used especially suitably as sealing materials for fuel cell such as packings to be used between the fuel cell electrodes and for peripheral pipes thereof.

Sliding Member:

In the field of automobile, examples are piston ring, shaft seal, valve stem seal, crank shaft seal, cam shaft seal and oil seal.

Generally there are exemplified fluorine-containing rubber products to be used on portions coming into contact with other material and undergoing sliding.

Non-Sticking Member:

There are exemplified hard disc crash stopper in the field of computer.

Field Making Use of Water- and Oil Repellency:

There are exemplified wiper blades for automobile and outdoor tent sheets.

EXAMPLE

The present invention is then explained by means of examples, but is not limited thereto.

Various characteristics to be used herein are measured by the following methods.

(1) ESCA

Measurement is carried out by one-reflection ATR method with FT-IR (model FTS-575C) available from VARIAN TECHNOLOGIES JAPAN LIMITED. Measuring conditions are as follows.

IRE: Diamond and Germanium
Incident angle: 45°
Resolution: 4 $cm^{-1}$
Integration: 64 times (2) IR F1s and C1s peaks are measured at a radiation angle of 90° by using ESCA3400 available from Shimadzu Corporation.

(3) Crosslinking (Vulcanization) Characteristics

Minimum torque (ML), maximum torque (MH), induction time (T10) and optimum vulcanization time (T90) are measured with Curastometer Model II (available from JSR corporation).

(4) 100% Modulus (M100)

Measurement is conducted according to JIS K6251.

(5) Tensile Strength at Break (Tb)

Measurement is conducted according to JIS K6251.

(6) Tensile Elongation at Break (Eb)

Measurement is conducted according to JIS K6251.

(7) Hardness (Shore A)

Measurement is conducted according to JIS K6253 with a duro-meter type A (peak value).

(8) Friction Coefficient

Measurement is conducted with a friction player FPR2000 available from Rhesca Corporation in a revolution mode at 20 g of weight, at 60 rpm and at 10 mm of radius of gyration, and friction coefficients are read just after starting of rotation, two minutes after and five minutes after. A value when a friction coefficient becomes stable is assumed to be a coefficient of dynamic friction.

Each product in Table and specification is as shown below.

Fluorine-containing rubber A1: Polyol-crosslinkable three-component fluorine-containing rubber (VdF/TFE/HFP=58/20/22 mol %). Mooney viscosity $ML_{1+10}$ (100° C.) is about 47.

Fluorine-containing rubber A2 (pre-compound): Fluorine-containing rubber pre-compound obtained by charging 100 parts by mass of Fluorine-containing rubber A1 in a pressure kneader, pouring 2.2 parts by mass of bisphenol AF and 0.56 part by mass of 8-benzyl-1,8-diazabicyclo[5,4,0]-7-undecenium chloride thereto, and kneading at a rubber blend temperature of 140° C. to 150° C. for 12 minutes.

Fluorine-containing rubber A3: Polyol-crosslinkable two-component fluorine-containing rubber (VdF/HFP=78/22 mol %). Mooney viscosity $M_{1+10}$ (100° C.) is about 65.

Fluorine-containing rubber A4: Fluorine-containing rubber pre-compound obtained by charging 100 parts by mass of Fluorine-containing rubber A3 in a pressure kneader, pouring 2.2 parts by mass of bisphenol AF and 0.5 part by mass of BTPPC thereto, and kneading at a rubber blend temperature of 140° C. to 150° C. for 12 minutes.

Fluorine-containing rubber A5: Fluorine-containing rubber pre-compound obtained by melt-kneading 100 parts by mass of Fluorine-containing rubber A3 and 33 parts by mass of Fluorine-containing resin B1 at 230° C. for 30 minutes, charging the mixture into a pressure kneader, pouring 2.2 parts by mass of bisphenol AF and 0.5 part by mass of BTPPC thereto, and kneading at a rubber blend temperature of 140° C. to 150° C. for 12 minutes.

Fluorine-containing rubber A6: Fluorine-containing rubber pre-compound obtained by melt-kneading 100 parts by mass of Fluorine-containing rubber A3 and 33 parts by mass of Fluorine-containing resin B1 at 230° C. for 30 minutes, charging the mixture into a pressure kneader, pouring 1.9 parts by mass of bisphenol AF and 0.3 part by mass of triphenyl(phenylmethyl)phosphonate of 4,4'-{2,2,2-trifluoro-1-(trifluoromethyl)ethylidene}bisphenol thereto, and kneading at a rubber blend temperature of 140° C. to 150° C. for 12 minutes.

Fluorine-containing rubber A7: Fluorine-containing rubber pre-compound obtained by charging 100 parts by mass of Fluorine-containing rubber A3 in a pressure kneader, pouring 4.4 parts by mass of bisphenol AF and 1.0 part by mass of BTPPC thereto, and kneading at a rubber blend temperature of 140° C. to 150° C. for 12 minutes.

Fluorine-containing resin B1: Copolymer of TFE/ethylene/2,3,3,4,4,5,5-heptafluoro-1-pentene=63.4/34.2/2.4 mol % (ETFE, melting point: 225° C.)

Fluorine-containing resin B2: Copolymer of ethylene/TFE/HFP (EFEP, brand name RP4020 available from Daikin Industries, Ltd., melting point: 160° C.)

Filler 1: Wollastonite (NYAD400 available from NYCO Minerals, Inc.)

Filler 2: Carbon black (MT carbon: N990 available from Cancarb Co., Ltd.)

Filler 3: Iron Oxide red (Bengara B Tenshoin available from Nippon Bengara Kogyo Co., Ltd.)

Acid acceptor 1: Magnesium oxide (MA150 available from Kyowa Chemical Industries, Co., Ltd.)

Crosslinking aid 1: Calcium hydroxide (CALDIC2000 available from Ohmi Chemical Industry Co., Ltd.)

Example 1

(I) Kneading Step (Preparation of Pre-Compound)

Into a 3-liter pressure kneader were poured 100 parts by mass of Fluorine-containing rubber A2 and 43 parts by mass of Fluorine-containing resin B1, followed by 30-minute melt-kneading at 220° C. which is lower by 5° C. than the melting point (225° C.) of Fluorine-containing resin B1 to prepare a pre-compound. The number of revolutions of a rotor was 30 rpm.

(Preparation of Full Compound)

The obtained pre-compound was wound on an open roll equipped with two 8-inch rolls, and thereto were added 5 parts by mass of Filler 1, 1.5 parts by mass of Filler 2, 1.5 parts by mass of Filler 3, 3 parts by mass of Acid acceptor 1, and 6 parts by mass of Crosslinking aid 1, followed by 20-minute kneading. Further, the obtained full compound was cooled for 24 hours, and again kneaded at 30° C. to 80° C. for 20 minutes by using an open roll equipped with two 8-inch rolls to prepare a full compound.

Crosslinking (vulcanization) characteristics of this full compound were evaluated. The results are shown in Table 1.

(II) Molding and Crosslinking Step (Molding Step)

The obtained full compound was finally molded into a 3 mm thick un-crosslinked fluorine-containing rubber sheet with a 8-inch open roll.

(Crosslinking Step)

This un-crosslinked fluorine-containing rubber sheet was subjected to press-crosslinking at 170° C. for 15 minutes in a metal mold to obtain a 2 mm thick crosslinked fluorine-containing rubber sheet.

With respect to the obtained crosslinked fluorine-containing rubber sheet, 100% modulus (M100), tensile strength at break (Tb), tensile elongation at break (Eb), hardness (Shore A, peak value) and friction coefficient were evaluated. The results are shown in Table 2.

(III) Heat-Treating Step

This crosslinked fluorine-containing rubber sheets (melting point of Fluorine-containing resin B1: 225° C.) were put in a heating oven kept at 200° C., 230° C. and 250° C. for 24 hours, respectively to be subjected to heat treatment.

With respect to the obtained crosslinked fluorine-containing rubber sheets (heat treated at 200° C., 230° C. and 250° C.), 100% modulus (M100), tensile strength at break (Tb), tensile elongation at break (Eb), hardness (Shore A, peak value) and friction coefficient were evaluated. The results are shown in Table 2.

Example 2

A crosslinked fluorine-containing rubber sheet was prepared by carrying out a kneading step and a molding and crosslinking step in the same manner as in Example 1 except that a kneading temperature in a step for preparing a pre-compound was changed to 225° C. (melting point of Fluorine-containing resin B1: 225° C.).

The obtained crosslinked fluorine-containing rubber sheets were subjected to heat treatment in a heating oven kept at 200° C., 230° C. and 250° C. for 24 hours in the same manner as in Example 1.

With respect to the obtained crosslinked fluorine-containing rubber sheets (heat treated at 200° C., 230° C. and 250° C.), 100° A) modulus (M100), tensile strength at break (Tb), tensile elongation at break (Eb), hardness (Shore A, peak value) and friction coefficient were evaluated.

Crosslinking (vulcanization) characteristics of the full compound are shown in Table 1, and characteristics of the crosslinked fluorine-containing rubber sheets are shown in Table 2.

Example 3

A crosslinked fluorine-containing rubber sheet was prepared by carrying out a kneading step and a molding and crosslinking step in the same manner as in Example 1 except that a kneading temperature in a step for preparing a pre-compound was changed to 230° C. (melting point of Fluorine-containing resin B1: 225° C.).

The obtained crosslinked fluorine-containing rubber sheets were subjected to heat treatment in a heating oven kept at 200° C., 230° C. and 250° C. for 24 hours in the same manner as in Example 1.

With respect to the obtained crosslinked fluorine-containing rubber sheets (heat treated at 200° C., 230° C. and 250° C.), 100% modulus (M100), tensile strength at break (Tb), tensile elongation at break (Eb), hardness (Shore A, peak value) and friction coefficient were evaluated.

Crosslinking (vulcanization) characteristics of the full compound are shown in Table 1, and characteristics of the crosslinked fluorine-containing rubber sheets are shown in Table 2.

Example 4

A crosslinked fluorine-containing rubber sheet was prepared in the same manner as in Example 1 except that a kneading temperature in a step for preparing a pre-compound was changed to 230° C. (melting point of Fluorine-containing resin B1: 225° C.), kneading was conducted for a period of time longer by 10 minutes than in Example 3 and then a pre-compound was prepared.

The obtained crosslinked fluorine-containing rubber sheets were subjected to heat treatment in a heating oven kept at 200° C., 230° C. and 250° C. for 24 hours in the same manner as in Example 1.

With respect to the obtained crosslinked fluorine-containing rubber sheets (heat treated at 200° C., 230° C. and 250° C.), 100% modulus (M100), tensile strength at break (Tb), tensile elongation at break (Eb), hardness (Shore A, peak value) and friction coefficient were evaluated.

Crosslinking (vulcanization) characteristics of the full compound are shown in Table 1, and characteristics of the crosslinked fluorine-containing rubber sheets are shown in Table 2.

Comparative Example 1

A crosslinked fluorine-containing rubber sheet was prepared by carrying out a molding and crosslinking step in the same manner as in Example 1 except that a fluorine-containing resin was not blended with Fluorine-containing rubber A2 to prepare a crosslinkable fluorine-containing rubber composition and the amount of Filler 1 was changed to 40 parts by mass. In this case, since there is no need of melt-kneading a fluorine-containing rubber and a fluorine-containing resin, a melt-kneading step was not carried out.

The obtained crosslinked fluorine-containing rubber sheets were subjected to heat treatment in a heating oven kept at 200° C., 230° C. and 250° C., respectively for 24 hours in the same manner as in Example 1.

With respect to the obtained crosslinked fluorine-containing rubber sheets (heat treated at 200° C., 230° C. and 250° C.), 100% modulus (M100), tensile strength at break (Tb), tensile elongation at break (Eb), hardness (Shore A, peak value) and friction coefficient were evaluated.

Crosslinking (vulcanization) characteristics of the full compound are shown in Table 1, and characteristics of the crosslinked fluorine-containing rubber sheets are shown in Table 2.

TABLE 1

|  | Ex. 1 | Ex. 2 | Ex. 3 | Ex. 4 | Com. Ex. 1 |
|---|---|---|---|---|---|
| Crosslinkable fluorine-containing rubber composition (part by mass) | | | | | |
| Fluorine-containing rubber A2 | 100 | 100 | 100 | 100 | 100 |
| Fluorine-containing resin B1 | 43 | 43 | 43 | 43 | — |
| Filler 1 | 5 | 5 | 5 | 5 | 40 |
| Filler 2 | 1.5 | 1.5 | 1.5 | 1.5 | 1.5 |
| Filler 3 | 1.5 | 1.5 | 1.5 | 1.5 | 1.5 |
| Acid acceptor 1 | 3 | 3 | 3 | 3 | 3 |
| Crosslinking aid 1 | 6 | 6 | 6 | 6 | 6 |
| Kneading conditions (temp × time) | | | | | |
| Pre-compound | 220° C. × 30 min | 225° C. × 30 min | 230° C. × 30 min | 230° C. × 40 min | — |
| Crosslinking (vulcanization) characteristics at 170° C. | | | | | |
| Minimum torque ML (N) | 5.7 | 5.9 | 5.9 | 6.2 | 2.4 |
| Maximum torque MH (N) | 21.9 | 22.6 | 25.3 | 24.9 | 17.7 |

TABLE 1-continued

|  | Ex. 1 | Ex. 2 | Ex. 3 | Ex. 4 | Com. Ex. 1 |
|---|---|---|---|---|---|
| Induction time T10 (min) | 4.3 | 4.4 | 3.9 | 4.4 | 2.2 |
| Optimum vulcanization time T90 (min) | 7.7 | 8.1 | 6.7 | 7.7 | 4.4 |

TABLE 2

| Molding and crosslinking conditions | Ex. 1 | Ex. 2 | Ex. 3 | Ex. 4 | Com. Ex. 1 |
|---|---|---|---|---|---|
| Press-crosslinking (temp × time) | 170° C. × 15 min | 170° C. × 15 min | 170° C. × 15 min | 170° C. × 15 min | 170° C. × 15 min |
| Heat treatment (temp ° C. × time) | Nil | Nil | Nil | Nil | Nil |
| M100 (MPa) | 18.2 | 19.9 | 21.0 | 20.0 | 3.7 |
| Tb (MPa) | 19.1 | 20.4 | 21.2 | 20.0 | 7.0 |
| Eb (%) | 130 | 100 | 110 | 100 | 360 |
| Hardness (Shore A) | 86.2 | 86.8 | 87.4 | 87.7 | 72.2 |
| Friction coefficient | 1.24 | 1.15 | 1.09 | 1.02 | 1.45 |
| Heat treatment (temp ° C. × time) | 200° C. × 24 hr | 200° C. × 24 hr | 200° C. × 24 hr | 200° C. × 24 hr | 200° C. × 24 hr |
| M100 (MPa) | 16.5 | 18.5 | 18.3 | 19.0 | 7.7 |
| Tb (MPa) | 19.6 | 21.0 | 19.5 | 20.6 | 10.2 |
| Eb (%) | 140 | 140 | 110 | 120 | 170 |
| Hardness (Shore A) | 87.0 | 87.1 | 87.0 | 87.7 | 73.8 |
| Friction coefficient | 1.37 | 1.14 | 1.06 | 1.09 | 1.35 |
| Heat treatment (temp ° C. × time) | 230° C. × 24 hr | 230° C. × 24 hr | 230° C. × 24 hr | 230° C. × 24 hr | 230° C. × 24 hr |
| M100 (MPa) | 6.6 | 6.8 | 6.9 | 6.6 | 7.3 |
| Tb (MPa) | 14.9 | 15.1 | 15.6 | 15.7 | 10.1 |
| Eb (%) | 350 | 350 | 350 | 350 | 180 |
| Hardness (Shore A) | 84.4 | 86.2 | 84.8 | 85.1 | 76.2 |
| Friction coefficient | 0.54 | 0.60 | 0.31 | 0.49 | 1.09 |
| Compression set (CS) 150° C. × 72 hr | 29.8 | 29.6 | 27.8 | 28.6 | 10.8 |
| Contact angle (°) water | 111 | 110 | 115 | 113 | 100 |
| Heat treatment (temp ° C. × time) | 250° C. × 24 hr | 250° C. × 24 hr | 250° C. × 24 hr | 250° C. × 24 hr | 250° C. × 24 hr |
| M100 (MPa) | 5.3 | 5.6 | 5.5 | 5.7 | 7.2 |
| Tb (MPa) | 13.3 | 13.5 | 13.4 | 13.5 | 10.3 |
| Eb (%) | 370 | 370 | 370 | 370 | 190 |
| Hardness (Shore A) | 85.6 | 85.0 | 85.1 | 85.7 | 75.0 |
| Friction coefficient | 0.47 | 0.73 | 0.76 | 0.5 | 1.53 |

From the results shown in Tables 1 and 2, it is seen that the crosslinkable rubber composition having greatly reduced friction coefficient can be obtained by conducting heat treatment at a temperature (220° C.) lower by 5° C. than the melting point (225° C.) of the mixed fluorine-containing resin.

Examples 5 to 12

Crosslinked fluorine-containing rubber sheets were prepared by carrying out a kneading step and a molding and crosslinking step in the same manner as in Example 1 except that fluorine-containing rubbers, fluorine-containing resins and further fillers, acid acceptor and crosslinking aid shown in Table 3 were blended in amounts shown in Table 3 and kneading temperature was changed as shown in Table 3 in a step for preparing a pre-compound (melting point of Fluorine-containing resin B1: 225° C. and melting point of Fluorine-containing resin B2: 160° C.).

In Table 3, Fluorine-containing rubber A5 and Fluorine-containing rubber A6 used in Examples 8 and 9, respectively are those prepared by previously kneading Fluorine-containing resin B1 (33 parts by mass) to Fluorine-containing rubber A3 (100 parts by mass) (Therefore, the amounts of fluorine-containing resin in Table 3 are indicated by "-".)

The obtained crosslinked fluorine-containing rubber sheets were put in a heating oven and heat-treated at 200° C. for 24 hours and at 230° C. for 24 hours in the same manner as in Example 1.

With respect to the obtained crosslinked fluorine-containing rubber sheets, 100% modulus (M100), tensile strength at break (Tb), tensile elongation at break (Eb), hardness (Shore A, peak value) and friction coefficient were evaluated.

Crosslinking (vulcanization) characteristics of the full compound are shown in Table 3, and characteristics of the crosslinked fluorine-containing rubber sheets are shown in Table 4.

TABLE 3

|  | Ex. 5 | Ex. 6 | Ex. 7 | Ex. 8 |
|---|---|---|---|---|
| Crosslinkable fluorine-containing rubber composition (part by mass) |  |  |  |  |
| Fluorine-containing rubber A4 | 100 | 100 | 100 | — |
| Fluorine-containing rubber A5 (containing Fluorine-containing resin B1) | — | — | — | 133 |
| Fluorine-containing rubber A6 (containing Fluorine-containing resin B1) | — | — | — | — |
| Fluorine-containing rubber A7 | — | — | — | — |

TABLE 3-continued

|  |  |  |  |  |
|---|---|---|---|---|
| Fluorine-containing resin B1 | 43 | 33 | 25 | — |
| Fluorine-containing resin B2 | — | — | — | — |
| Filler 2 | 1 | 1 | 1 | 1 |
| Acid acceptor 1 | 3 | 3 | 3 | 3 |
| Crosslinking aid 1 | 6 | 6 | 6 | 6 |
| Kneading conditions (temp × time) |  |  |  |  |
| Pre-compound | 230° C. × 30 min | 230° C. × 30 min | 230° C. × 30 min | 230° C. × 30 min |
| Crosslinking (vulcanization) characteristics at 170° C. |  |  |  |  |
| Minimum torque ML (N) | 2.7 | 2.5 | 2.0 | 2.4 |
| Maximum torque MH (N) | 38.2 | 34.5 | 33.9 | 35.9 |
| Induction time T10 (min) | 4.4 | 4.1 | 4.1 | 3.7 |
| Optimum vulcanization time T90 (min) | 6.7 | 6.3 | 6.0 | 5.8 |

|  | Ex. 9 | Ex. 10 | Ex. 11 | Ex. 12 |
|---|---|---|---|---|
| Crosslinkable fluorine-containing rubber composition (part by mass) |  |  |  |  |
| Fluorine-containing rubber A4 | — | — | 100 | 100 |
| Fluorine-containing rubber A5 (containing Fluorine-containing resin B1) | — | — | — | — |
| Fluorine-containing rubber A6 (containing Fluorine-containing resin B1) | 133 | — | — | — |
| Fluorine-containing rubber A7 | — | 100 | — | — |
| Fluorine-containing resin B1 | — | 33 | — | — |
| Fluorine-containing resin B2 | — | — | 43 | 43 |
| Filler 2 | 1 | 1 | 1 | 1 |
| Acid acceptor 1 | 3 | 3 | 3 | 3 |
| Crosslinking aid 1 | 6 | 6 | 6 | 6 |
| Kneading conditions (temp × time) |  |  |  |  |
| Pre-compound | 230° C. × 30 min | 230° C. × 30 min | 170° C. × 30 min | 170° C. × 30 min @150° C. |
| Crosslinking (vulcanization) characteristics at 170° C. |  |  |  |  |
| Minimum torque ML (N) | 2.7 | 2.0 | 2.0 | 3.4 |
| Maximum torque MH (N) | 40.6 | 43.6 | 17.8 | 14.9 |
| Induction time T10 (min) | 2.6 | 4.4 | 3.1 | 16.7 |
| Optimum vulcanization time T90 (min) | 3.9 | 6.9 | 5.3 | 37.8 |

TABLE 4

| Molding and crosslinking conditions | Ex. 5 | Ex. 6 | Ex. 7 | Ex. 8 |
|---|---|---|---|---|
| Press-crosslinking (temp × time) | 170° C. × 15 min | 170° C. × 15 min | 170° C. × 15 min | 170° C. × 15 min |
| Heat treatment (temp ° C. × time) | Nil | Nil | Nil | Nil |
| M100 (MPa) | 10.7 | 4.8 | 3.7 | 5.4 |
| Tb (MPa) | 13.9 | 9.6 | 8.7 | 9.2 |
| Eb (%) | 210 | 260 | 250 | 240 |
| Hardness (Shore A) | 82.4 | 74.3 | 71.8 | 75.6 |
| Friction coefficient | 1.14 | 1.66 | 1.66 | 1.03 |
| Heat treatment (temp ° C. × time) | 200° C. × 24 hr | 200° C. × 24 hr | 200° C. × 24 hr | 200° C. × 24 hr |
| M100 (MPa) | — | — | — | — |
| Tb (MPa) | — | — | — | — |
| Eb (%) | — | — | — | — |
| Hardness (Shore A) | — | — | — | — |
| Friction coefficient | — | — | — | — |
| Heat treatment (temp ° C. × time) | 230° C. × 24 hr | 230° C. × 24 hr | 230° C. × 24 hr | 230° C. × 24 hr |
| M100 (MPa) | 5.9 | 4.7 | 4 | 4.6 |
| Tb (MPa) | 14.5 | 14.1 | 11.8 | 12.1 |
| Eb (%) | 310 | 320 | 280 | 280 |
| Hardness (Shore A) | 81.7 | 75.8 | 72.6 | 75.7 |
| Friction coefficient | 0.39 | 0.93 | 1.01 | 0.92 |
| Compression set (CS) 150° C. × 72 hr | 26.4 | 21.2 | 17.7 | 21.7 |
| Contact angle (°) water | 114 | 109 | 107 | 110 |

| Molding and crosslinking conditions | Ex. 9 | Ex. 10 | Ex. 11 | Ex. 12 |
|---|---|---|---|---|
| Press-crosslinking (temp × time) | 170° C. × 15 min | 170° C. × 15 min | 170° C. × 15 min | 150° C. × 45 min |
| Heat treatment (temp ° C. × time) | Nil | Nil | Nil | Nil |
| M100 (MPa) | 5.5 | 6.5 | 5.7 | 5.9 |
| Tb (MPa) | 9.6 | 9.0 | 11.8 | 6.8 |
| Eb (%) | 220 | 160 | 310 | 450 |
| Hardness (Shore A) | 74.8 | 81.2 | 87 | 83 |

TABLE 4-continued

| Friction coefficient | 1.11 | 1.27 | 1.19 | 1.12 |
|---|---|---|---|---|
| Heat treatment (temp ° C. × time) | 200° C. × 24 hr | 200° C. × 24 hr | 200° C. × 24 hr | 200° C. × 24 hr |
| M100 (MPa) | — | — | 5.9 | 5.9 |
| Tb (MPa) | — | — | 16.5 | 18.3 |
| Eb (%) | — | — | 330 | 350 |
| Hardness (Shore A) | — | — | 84 | 84 |
| Friction coefficient | — | — | 0.76 | 0.99 |
| Heat treatment (temp ° C. × time) | 230° C. × 24 hr | 230° C. × 24 hr | 230° C. × 24 hr | 230° C. × 24 hr |
| M100 (MPa) | 4.9 | 6.7 | 6 | 6.1 |
| Tb (MPa) | 12.6 | 10.9 | 17 | 19 |
| Eb (%) | 260 | 180 | 340 | 350 |
| Hardness (Shore A) | 75.9 | 82.4 | 87 | 84 |
| Friction coefficient | 1.04 | 0.94 | 0.71 | 0.74 |
| Compression set (CS) 150° C. × 72 hr | 21.9 | 11.3 | 27.3 | 27.1 |
| Contact angle (°) water | 110 | 109 | 113 | 114 |

From the results of Tables 3 and 4, it is seen that by carrying out heat treatment at a temperature of not less than the melting point of the mixed fluorine-containing resin, a crosslinkable rubber composition having greatly reduced friction coefficient can be obtained.

Example 13

A kneading step (I) and a molding and crosslinking step (II) were carried out in the same manner as in Example 1 to produce a crosslinked molded article.

The obtained crosslinked molded article was subjected to heat treatment at a heat-treating temperature (200° C., 220° C., 230° C. and 250° C.) shown in Table 5 for a period of time shown in Table 5, and a friction coefficient of the obtained crosslinked molded article subjected to heat treatment was evaluated. The results are shown in Table 5.

TABLE 5

|  |  | Heat-treating temperature (° C.) | | | | |
|---|---|---|---|---|---|---|
|  |  | Nil | 200 | 220 | 230 | 250 |
| Heat-treating time | 0 hr | 1.24 | 1.24 | 1.24 | 1.24 | 1.24 |
|  | 1 hr | — | — | — | 0.85 | 0.27 |
|  | 2 hr | — | — | 1.25 | 0.86 | 0.54 |
|  | 6 hr | — | — | — | 0.41 | — |
|  | 12 hr | — | — | — | 0.40 | — |
|  | 24 hr | — | 1.37 | 0.97 | 0.54 | 0.47 |

The results shown in Table 5 indicates that in the case where a heat-treating temperature is higher (230° C., 250° C.) than the melting point (225° C.) of ETFE, a friction coefficient is reduced by heat treatment for a relatively short period of time. A heat-treating time has a negative correlation with a heat-treating temperature. In the temperature (220° C.) lower by 5° C. than the melting point (225° C.) of ETFE, it takes time (24 hours) for heat treatment, but an effect of reducing a friction coefficient appears.

On the other hand, in the temperature (200° C.) lower by more than 5° C. than the melting point (225° C.) of ETFE, a friction coefficient is not reduced even if heat treatment is carried out for a long period of time.

Example 14

ESCA Analysis

A kneading step (I) and a molding and crosslinking step (II) were carried out in the same manner as in Example 1 to produce crosslinked molded articles.

The obtained crosslinked molded articles were subjected to heat treatment at 200° C., 230° C. and 250° C., respectively for 24 hours. The obtained heat-treated molded articles each were subjected to ESCA analysis.

As a result, a ratio ($P_{ESCA}1/P_{ESCA}2$) of peak ($P_{ESCA}1$) due to bonding energy (295 eV) derived from $CF_3$ of the fluorine-containing rubber A1 (VdF/TFE/HFP) to peak ($P_{ESCA}2$) due to bonding energy (293 eV) derived from the fluorine-containing resin B1 (ETFE) is 0.25 before the heat treatment, and the ratio at 200° C.×24 hr does not change, namely 0.25, but the ratio at 230° C.×24 hr and the ratio at 250° C.×24 hr are greatly reduced, namely 0.16 and 0.14, respectively.

This indicates that the fluorine-containing resin (ETFE) is collected in the surface region of the crosslinked article by the heat treatment of the present invention at a temperature of not less than the specific temperature.

Example 15

IR Analysis

A kneading step (I) and a molding and crosslinking step (II) were carried out in the same manner as in Example 1 to produce crosslinked molded articles (2 mm thick).

The obtained crosslinked molded articles were subjected to heat treatment at 200° C., 230° C. and 250° C. for 24 hours. The obtained heat-treated molded articles were subjected to IR analysis.

A peak ($P_{IR}1$) of characteristic absorption (1,430 $cm^{-1}$) derived from CH deformation vibration of the VdF unit of Fluorine-containing rubber A1 (VdF/TFE/HFP) and a peak ($P_{IR}2$) of characteristic absorption (1,450 $cm^{-1}$) derived from CH deformation vibration of Fluorine-containing resin B1 (ETFE) were measured at a depth of 0.5 μm ($P_{IR0.5}$) and 1.2 μm ($P_{IR1.2}$) from the surface and at the center ($P_{IRC}$). Further, a ratio of $P_{IR}1/P_{IR}2$ at each depth was determined. The results are shown in Table 6.

TABLE 6

|  | | Heat treatment | | |
|---|---|---|---|---|
|  | Nil | 200° C. × 24 hr | 230° C. × 24 hr | 250° C. × 24 hr |
| Depth 0.5 μm | | | | |
| $P_{IR}1$ | 0.223 | 0.216 | 0.119 | 0.127 |
| $P_{IR}2$ | 0.265 | 0.244 | 0.986 | 0.597 |
| $P_{IR}1/P_{IR}2$ | 0.84 | 0.89 | 0.12 | 0.21 |

TABLE 6-continued

|  | Heat treatment | | | |
| --- | --- | --- | --- | --- |
|  | Nil | 200° C. × 24 hr | 230° C. × 24 hr | 250° C. × 24 hr |
| Depth 1.2 μm |  |  |  |  |
| $P_{IR}1$ | 0.223 | 0.222 | 0.126 | 0.134 |
| $P_{IR}2$ | 0.345 | 0.374 | 0.879 | 0.614 |
| $P_{IR}1/P_{IR}2$ | 0.65 | 0.59 | 0.14 | 0.22 |
| Center |  |  |  |  |
| $P_{IR}1$ | 0.216 | 0.233 | 0.157 | 0.147 |
| $P_{IR}2$ | 0.475 | 0.515 | 0.338 | 0.320 |
| $P_{IR}1/P_{IR}2$ | 0.45 | 0.45 | 0.46 | 0.46 |

From the results shown in Table 6, the followings can be seen. Namely, in the case of the crosslinked molded article before the heat treatment, the proportion of the fluorine-containing resin (ETFE, melting point: 225° C.) is high at its center, and this tendency is maintained also in the case of heat treatment of 200° C.×24 hr. However, in the cases of heat treatment of 230° C.×24 hr and 250° C.×24 hr, the proportion of the fluorine-containing resin at the center does not change but the proportion of the fluorine-containing resin at the surface portion is greatly high, which indicates that the fluorine-containing resin has been migrated toward the surface. When comparing the depth of 0.5 μm and 1.2 μm, the proportion of the fluorine-containing resin is higher at the depth near the surface (depth of 0.5 μm).

The invention claimed is:

1. A sliding member obtained by heating a crosslinked molded article at a temperature of not less than 225° C. and not more than 250° C. for a time between 1 hour and 24 hours,
   wherein the crosslinked molded article is obtained by crosslinking a crosslinkable fluorine-containing rubber composition comprising a fluorine-containing rubber (A) comprising vinylidene fluoride unit, the fluorine-containing resin (B) and a polyol crosslinking agent (C),
   wherein the vinylidene fluoride unit in the fluorine-containing rubber (A) is present in an amount of 58 mol % to 85 mol %,
   wherein the fluorine-containing resin (B) is a copolymer of tetrafluoroethylene/ethylene/2,3,3,4,4,5,5-heptafluoro-1-pentene comprising 2,3,3,4,4,5,5-heptafluoro-1-pentene in an amount of from 0.1 to 5 mol % or a copolymer of tetrafluoroethylene/ethylene/1,1,2-trihydroperfluorohexene-1 comprising 1,1,2-trihydroperfluorohexene-1 in an amount of from 0.1 to 5 mol %,
   wherein the mass ratio (A)/(B) of the fluorine-containing rubber (A) to the fluorine-containing resin (B) is 60/40 to 97/3,
   wherein the fluorine-containing rubber (A) and the fluorine-containing resin (B) are kneaded at a temperature of not less than a temperature being lower by 5° C. than the melting point of the fluorine-containing resin (B), thereby preparing the crosslinkable fluorine-containing rubber composition,
   wherein the ratio ($P_{IR0.5}1/P_{IR0.5}2$) of peak ($P_{IR0.5}1$) of characteristic absorption derived from the fluorine-containing rubber (A) in 0.5 μm depth from the surface of the sliding member to peak ($P_{IR0.5}2$) derived from the fluorine-containing resin (B) is smaller than a ratio ($P_{IR1.2}1/P_{IR1.2}2$) in 1.2 μm depth.

2. A non-sticking member obtained by heating a crosslinked molded article at a temperature of not less than 225° C. and not more than 250° C. for a time of between 1 hour and 24 hours,
   wherein the crosslinked molded article is obtained by crosslinking a crosslinkable fluorine-containing rubber composition comprising a fluorine-containing rubber (A) comprising vinylidene fluoride unit, the fluorine-containing resin (B) and a polyol crosslinking agent (C),
   wherein the vinylidene fluoride unit in the fluorine-containing rubber (A) is present in an amount of 58 mol % to 85 mol %,
   wherein the fluorine-containing resin (B) is copolymer of tetrafluoroethylene/ethylene/2,3,3,4,4,5,5-heptafluoro-1-pentene comprising 2,3,3,4,4,5,5-heptafluoro-1-pentene in an amount of from 0.1 to 5 mol %, or a copolymer of tetrafluoroethylene/ethylene/1,1,2-trihydroperfluorohexene-1 comprising 1,1,2-trihydroperfluorohexene-1 in an amount of from 0.1 to 5 mol %,
   wherein the mass ratio (A)/(B) of the fluorine-containing rubber (A) to the fluorine-containing resin (B) is 60/40 to 97/3,
   wherein the fluorine-containing rubber (A) and the fluorine-containing resin (B) are kneading at a temperature of not less than a temperature being lower by 5° C. than the melting point of the fluorine-containing resin (B), thereby preparing the crosslinkable fluorine-containing rubber composition,
   wherein the ratio ($P_{IR0.5}1/P_{IR0.5}2$) of peak ($P_{IR0.5}1$) of characteristic absorption derived from the fluorine-containing rubber (A) in 0.5 μm depth from the surface of the sliding non-sticking member to peak ($P_{IR0.5}2$) derived from the fluorine-containing resin (B) is smaller than a ratio ($P_{IR1.2}1/P_{IR1.2}2$) in 1.2 μm depth.

* * * * *